US012056622B2

(12) United States Patent
Xu et al.

(10) Patent No.: US 12,056,622 B2
(45) Date of Patent: Aug. 6, 2024

(54) IDENTIFYING INFLUENTIAL EFFECTS TO BE ADJUSTED IN GOAL SEEK ANALYSIS

(71) Applicant: INTERNATIONAL BUSINESS MACHINES CORPORATION, Armonk, NY (US)

(72) Inventors: Jing James Xu, Xi'an (CN); Lei Gao, Xi'an (CN); A Peng Zhang, Xi'an (CN); Rui Wang, Xi'an (CN); Si Er Han, Xi'an (CN); Xiao Ming Ma, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 17/166,793

(22) Filed: Feb. 3, 2021

(65) Prior Publication Data

US 2022/0245483 A1    Aug. 4, 2022

(51) Int. Cl.
*G06N 5/00*    (2023.01)
*G06N 5/04*    (2023.01)

(52) U.S. Cl.
CPC ..................................... *G06N 5/04* (2013.01)

(58) Field of Classification Search
None
See application file for complete search history.

(56) References Cited

U.S. PATENT DOCUMENTS

| 7,720,641 | B2 | 5/2010 | Alagappan et al. | |
| 8,564,802 | B2 * | 10/2013 | Adachi | B41J 2/2135 |
| | | | | 358/1.14 |
| 8,732,534 | B2 * | 5/2014 | Kini | G06F 11/008 |
| | | | | 714/47.1 |
| 10,521,490 | B2 * | 12/2019 | Nakabayashi | G06Q 10/06 |
| 11,004,007 | B2 * | 5/2021 | Tanimoto | G06N 20/00 |
| 11,550,965 | B2 * | 1/2023 | Yanamadala | G06F 21/552 |
| 2017/0132383 | A1 | 5/2017 | Myers et al. | |
| 2019/0015043 | A1 | 1/2019 | Kusukame et al. | |

(Continued)

OTHER PUBLICATIONS

Machorro-Cano, et al., "PISIoT: A Machine Learning and IoT-Based Smart Health Platform for Overweight and Obesity Control," Applied Sciences; vol. 9, Issue. 15; 10.3390/app9153037; Jul. 28, 2019, 23 pages.

*Primary Examiner* — Maikhanh Nguyen
(74) *Attorney, Agent, or Firm* — Patents+ Team

(57) ABSTRACT

A method for identifying influential effects that contribute most to a status change of a target index for goal seeking analysis. The method includes generating a candidate list of significant changed predictors between the normal and abnormal status time periods in collected data, and building a plurality of regression models from the collected data. The method determines a first value (trend value or Pearson correlation value) for each of the significant changed predictors based on whether at least one of the significant changed predictors have a significant change trend using the regression models. The method obtains a second predictor importance value for each of the significant changed predictors from a single model built on all the collected data. The method generates a final predictor value for each of the significant changed predictors by combining the first value with the second predictor importance value for each of the significant changed predictors.

20 Claims, 5 Drawing Sheets

(56) References Cited

U.S. PATENT DOCUMENTS

| | | |
|---|---|---|
| 2020/0107733 A1 | 4/2020 | Valys et al. |
| 2020/0272614 A1* | 8/2020 | Yang .................. G06F 16/2329 |
| 2021/0089932 A1 | 3/2021 | Han |

\* cited by examiner

200

| | 1-JAN | 2-JAN | ... | 1-FEB | 2-FEB | ... | 1-NOV | ... | 31-DEC |
|---|---|---|---|---|---|---|---|---|---|
| TARGET | 0.7 | 0.73 | ... | 0.67 | 0.73 | ... | 1.01 | ... | 1.25 |
| V1 | 15.12 | 16.24 | ... | 15.12 | 16.24 | ... | 15.12 | ... | 17.1 |
| V2 | 123 | 150 | ... | 123 | 150 | ... | 123 | ... | 200.1 |
| V3 | 89 | 56 | ... | 89 | 56 | ... | 103 | ... | 102 |
| ... | ... | ... | ... | ... | ... | ... | ... | ... | ... |
| $V_N$ | 154 | 162 | ... | 154 | 162 | ... | 154 | ... | 187 |

*FIG. 2*

IDENTIFYING INFLUENTIAL EFFECTS TO BE ADJUSTED IN GOAL SEEK ANALYSIS

BACKGROUND

Goal seeking is a general term used to describe the process involved in determining input values based on a known output value. Goal seek analysis is a common analysis method for changing target by adjusting effects.

SUMMARY

In an embodiment, a computer-implemented method for identifying influential effects that contribute most to a status change of a target index is disclosed. The method includes collecting data comprising a plurality of predictors corresponding to a plurality of time periods. The data indicates a target index value for each time period in the plurality of time periods. Each of the time periods is identified as being one of a normal status or an abnormal status based on the target index value for each of the time period. The method generates a candidate list that includes significant changed predictors between the time periods having the normal status and the time periods having the abnormal status. The method builds a plurality of regression models from the collected data. The method obtains a first predictor importance value for each of the significant changed predictors from each regression model in the plurality of regression models to produce a set of predictor importance values for each of the significant changed predictors. The method generates a series based on the set of predictor importance values for each of the significant changed predictors. The method computes a trend value for each of the series of the significant changed predictors. The method determines whether at least one of the significant changed predictors have a significant change trend based on the trend value for each of the significant changed predictors. The method builds a single model from the data comprises all the plurality of time periods. The method obtains a second predictor importance value for each of the significant changed predictors from the single model. The method combines a first value and the second predictor importance value for each of the significant changed predictors to produce a final predictor value for each of the significant changed predictors. In an embodiment, the first value is the trend value when there is at least one of the significant changed predictors have a significant change trend. Conversely, the first value is a Pearson correlation value when none of the significant changed predictors have a significant change trend. The method sorts the final predictor value for each of the significant changed predictors from high to low to identify the significant changed predictors that contribute most to the status change of the target index from the normal status to the abnormal status.

In an embodiment, the computer-implemented method generates the candidate list by comparing a value distribution for each of the plurality of predictors between the normal status and the abnormal status using a nonparametric test, and comparing a series trait for each of the plurality of predictors between the normal status and the abnormal status. The method identifies a predictor as a significant changed predictor for the candidate list when at least one of the value distribution or the series trait for the predictor between the normal status and the abnormal status is not similar (i.e., not within on a predetermined threshold).

In an embodiment, each regression model in the plurality of regression models comprises a same internal time interval, the plurality of regression models built from the time periods having the normal status to the time periods having the abnormal status.

In an embodiment, the computer-implemented method determines the Pearson correlation value by selecting a first regression model having the normal status from the plurality of regression models, and computing the Pearson correlation value for each of the significant changed predictors in the candidate list in the first regression model.

In an embodiment, the computer-implemented method computes the Pearson correlation value for each of the significant changed predictors in the candidate list in the first regression model by selecting a significant changed predictor in the candidate list, and replacing a set of values of the significant changed predictor in the first regression model with a second set of values from one of the time periods having the abnormal status, while maintaining all other field values unchanged.

Other embodiments including a system and computer program product, and the advantages thereof are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a diagram illustrating a data table in accordance with an embodiment of the present disclosure.

Figure 1:
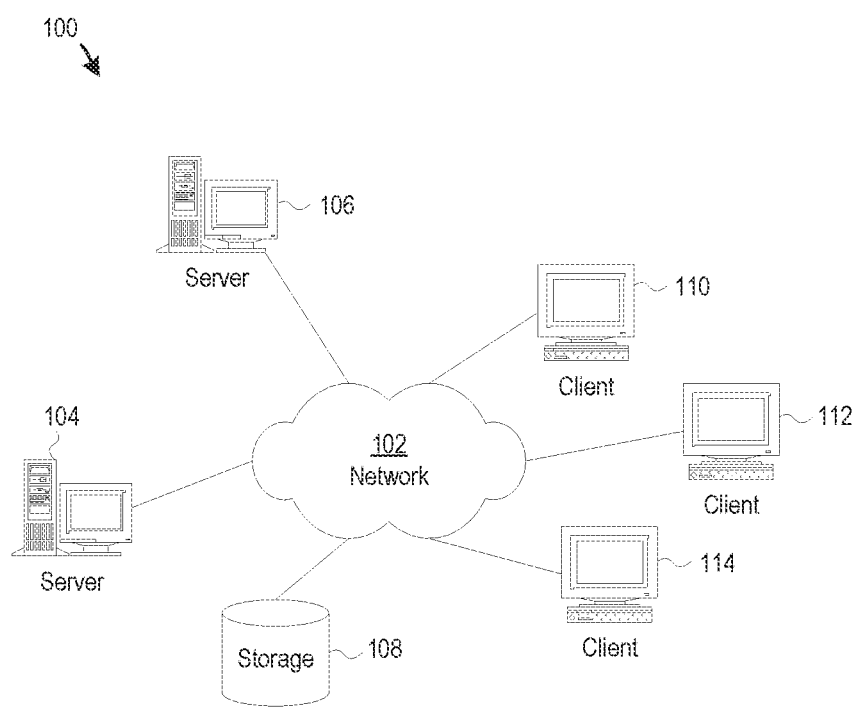
FIG. 1 is a diagram illustrating a network of data processing systems 100 in accordance with an embodiment of the present disclosure.

The illustrated figures are only exemplary and are not intended to assert or imply any limitation with regard to the environment, architecture, design, or process in which different embodiments may be implemented.

DETAILED DESCRIPTION

In order to achieve a target goal effectively in goal seeking analysis, the effects that lead to a status change need to be adjusted. For instance, weight, blood pressure, strength of materials, and air pollution are examples of some specific status or index that are often of concern. When an index status becomes abnormal, it is important to determine the influential effects that caused the abnormal status. Once the influential effects are determined, they can be adjusted to return the index to a normal status. Thus, as disclosed herein, it would be beneficial to provide an automated method, system, and computer program product that can determine the most influential effects that contribute to a status change of an index from normal to abnormal. As described herein, the disclosed embodiments provide several technical advantages including combining both the influential impact that leads to target status change with the contribution that affects absolute target values to select adjusting predictors for goal seek analysis.

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to." Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions or computer executable instructions configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

FIG. 1 is a diagram illustrating a network of data processing systems 100 in accordance with an embodiment of the present disclosure. The network of data processing systems 100 is a network of computers or other electronic devices in which one or more disclosed embodiments may be implemented. In the depicted embodiment, the network of data processing systems 100 includes one or more network devices such as, but not limited to, server 104, server 106, client 110, client 112, client 114, and storage unit 108. The network of data processing systems 100 may include additional servers, clients, and other devices not shown.

The network of data processing systems 100 communicate over a network 102. The network 102 provides communications links between the various devices. The communication links may include both wired and wireless links, and may be a direct link or may comprise of multiple links passing through one or more communication network devices such as, but not limited to, routers, firewalls, servers, and switches. The network device may be located on various types of networks such as local-area networks (LANs), wide-area networks (WANs), and metropolitan-area networks (MANs). The networks may include private networks and/or public networks such as the Internet. Additionally, in certain embodiments, communication links may also encompass internal communication between various components of a system and/or with an external input/output device such as a keyboard or display device.

In the depicted embodiment, clients 110, 112, and 114 may be, for example, personal computers or network computers. Clients 110, 112, and 114 can be clients to the server 104 and/or the server 106. The server 104, server 106, and/or the storage unit 108 may provide data or other services to the clients 110, 112, and 114. As an example, in an embodiment, the client 110 receives, collects, or obtains data from the server 104, server 106, and/or the storage unit 108 that includes a plurality of predictors corresponding to a plurality of time periods that can be used for identifying influential effects that contribute most to a status change of a target index for goal seek analysis.

FIG. 2 is a diagram illustrating a data table 200 in accordance with an embodiment of the present disclosure. In the depicted embodiment, the data table 200 stores example data that was collected daily over a span of a year between January 1st and December 31st for goal seeking analysis. The illustrated data is not limited to any particular goal seeking analysis. For example, the data may be used to analyze weight, blood pressure, strength of materials, pollution or any other specific status or index of concern. For each day, the data table 200 stores values for a plurality of variables V1-Vn. For example, the variables could be a measure of a person's electrolytes such as sodium, calcium, potassium, chloride, phosphate, and magnesium for overall health goal seeking analysis. In the depicted embodiment, the data table 200 also stores a daily target value that is determined based on the values of the plurality of variables V1-Vn. The value of the target value may be dependent on the purpose of the particular goal seeking analysis. As shown in FIG. 2, the target value for January 1st was 0.7, 0.73 on January 2nd, and so on. In an embodiment, a normal status for the particular goal seeking analysis is a target value of less than or equal to one (<=1). In the depicted embodiment, on November 1st the target value was determined to be 1.01, and prior to November 1st, although not all the data is illustrated, the target value was less than or equal to one. From November 1st to December 31st the target value was greater than one. Thus, from January 1st to October 31st the target had a normal status, and from November 1st to December 31st the target had an abnormal status. As stated above, it would be beneficial to provide an automated method, system, and computer program product that can identify the effects (i.e., variables V1-Vn) that contribute most to a status change of the target index.

Figure 3:
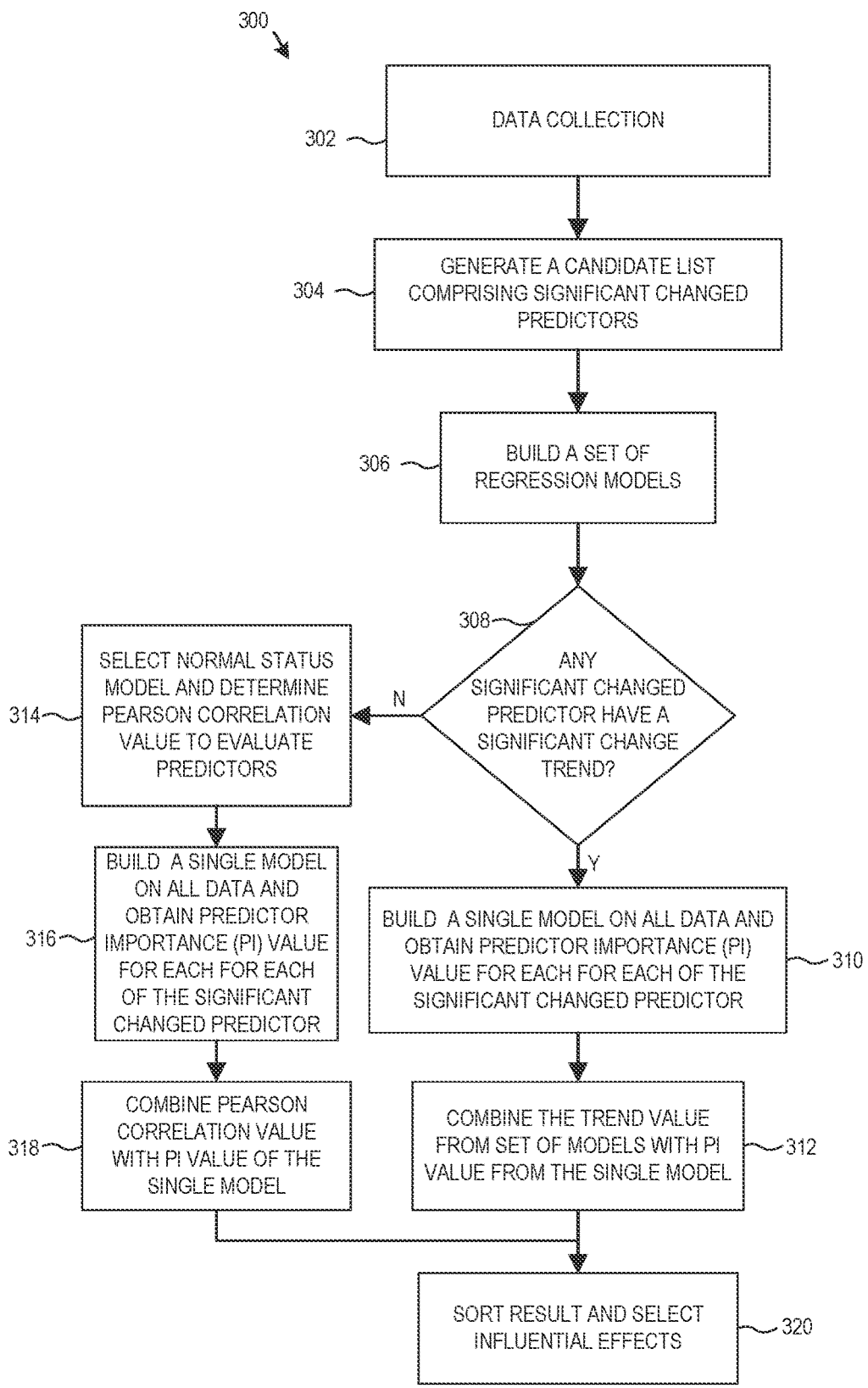
FIG. 3 is a flowchart illustrating a process for identifying influential effects that contribute most to a status change of a target index in accordance with an embodiment of the present disclosure.

FIG. 3 is a flowchart illustrating a process 300 for identifying influential effects that contribute most to a status change of a target index in accordance with an embodiment of the present disclosure. In an embodiment, the process 300 can be performed by the data processing system such as the client 110 and/or the server 104 in FIG. 1. The process 300 begins at step 302 by performing data collection such as, but not limited to, the data collected in the data table 300 in FIG. 2. The data may be collected over a period of time or may be obtained from another system configured to store the data. The data may include a target index indicating whether the data collected for particular time period is within a normal status range. Alternatively, in some embodiments, the process 300 may calculate the target index for each time period from the collected data. Using the collected data, the process 300 can identify for each of the time periods as being one of a normal status or an abnormal status based on the target index value for each of the time periods.

At step 304, the process 300 generates a candidate list that includes significant changed predictors (e.g., variables V1-Vn in FIG. 2) between the time periods having the normal status and the time periods having the abnormal status. In an embodiment, to determine the candidate list, the process 300 compares predictor statistics (variables) between normal and abnormal status to determine whether a predictor value varies significantly between normal and abnormal status and determine predictors that have different statistical traits between the two status. For example, in an embodiment, the process 300 compares both a value distribution and a series trait for each of the plurality of predictors between the normal status and the abnormal status. In an embodiment, the value distribution is compared using a nonparametric test. Nonparametric tests are methods of statistical analysis that do not require a distribution to meet the required assumptions to be analyzed (especially if the data is not normally distributed). Due to this reason, they are sometimes referred to as distribution-free tests. In an embodiment, to compare the series trait for each of the plurality of predictors between the normal status and the abnormal status, the process 300 generates two series by time for normal and abnormal phase separately (charting the variable values). The process 300 then compares the series trait, such as trend, season, or other series trait. In an embodiment, the process 300 identifies a predictor as a significant changed predictor for the candidate list when either, or both, the value distribution between the normal status and the abnormal status or the series trait for the predictor between the normal status and the abnormal status are not similar (e.g., having a similar distribution similar trend according to a predetermined or user-specified threshold).

Figure 4:
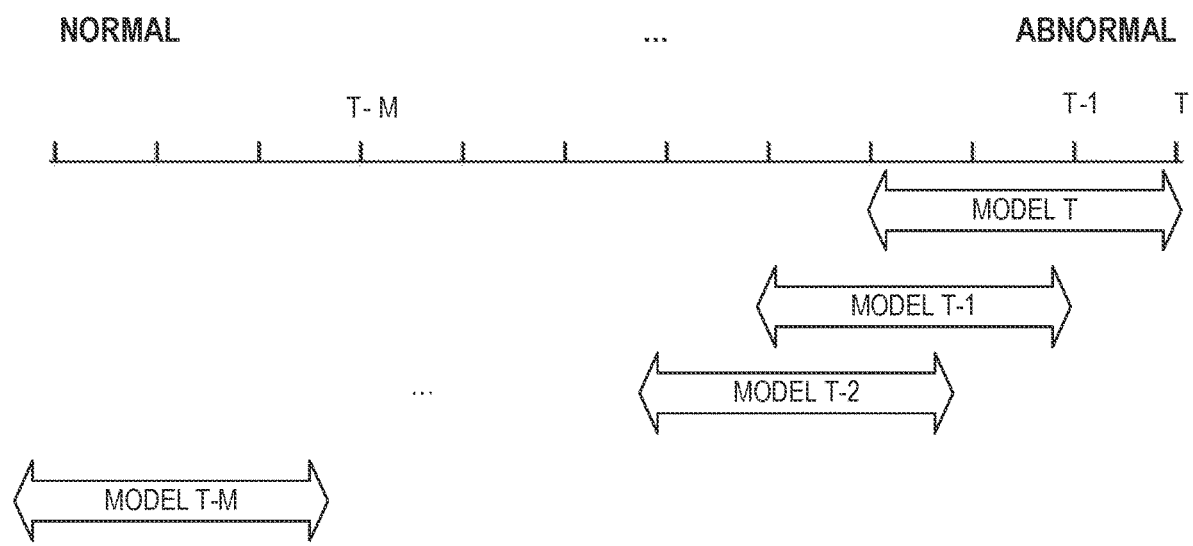
FIG. 4 is a diagram illustrating a plurality of regression models built from the time periods having the normal status to the time periods having the abnormal status in accordance with an embodiment of the present disclosure.

The process 300 at step 306 builds a plurality of regression models. A regression model is a mathematical model that is used to determine the strength and character of the relationship between one dependent variable (usually denoted by Y) and a series of other variables (known as independent variables). In an embodiment, the plurality of regression models is built from the time periods having the normal status to the time periods having the abnormal status. For instance, as depicted in FIG. 4, a first model, Model T, is built starting at time T. A second model, Model T−1, is built starting at time T−1. A third model, Model T−2, is built starting at time T−2, and so on. Each regression model uses the same internal time interval and the same amount of data (e.g., every model is built using 3 months' worth of data as described in FIG. 2). In an embodiment, the data covered by a regression model can overlap the data utilized by a preceding model and/or a subsequent model. For example, in FIG. 4, the data covered by Model T−1 overlaps the data of Model T and Model T−2.

At step 308, the process 300 determines whether any of the significant changed predictors in the candidate list have a significant changed trend using the plurality of regression models. In an embodiment, to determine whether any of the significant changed predictors in the candidate list have a significant changed trend, the process 300 obtains, for each of the significant changed predictors in the candidate list, a predictor importance (PI) value for the significant changed predictor from each of the regression model in the plurality of regression models (e.g., from Model T−m to Model T) to generate a PI time series data to produce a set of PI values for each of the significant changed predictors. For example, the process 300 obtains a first PI value for variable 1 from model T−m, a second PI value for variable 1 from model T−1, a third PI value for variable 1 from model T−k, . . . , and an M+1 PI value from model T to produce a set of PI values for variable 1. The same process is performed to produce a set of PI values for variable 2, and so on. The process 300 then generates a series based on the set of predictor importance values for each of the significant changed predictors. The process 300 computes a trend (Tr) value for each of the series of the significant changed predictors in the candidate list to obtain Tr1, Tr2, In an embodiment, the process 300 uses a time series algorithm for determining the Tr for each of the series of the significant changed predictors. A time series algorithm extracts certain statistical information and characteristics from time-series data (i.e., a set of ordered data points with respect to time), in order to predict the future values based on stored past time-series data. In an embodiment, the process 300 determines that a significant changed predictor in the candidate list has a significant change trend when the Tr value of the significant changed predictor is greater than a threshold. The value of the threshold can be predetermined or user-specified. When at least one of the significant changed predictors in the candidate list has a significant change trend, the process 300 proceeds to step 310. When none of the significant changed predictors in the candidate list have a significant change trend, the process 300 proceeds to step 314.

Assuming that the process 300 at step 308 determines that there is at least one significant changed predictor in the candidate list that has a significant change trend, the process 300 at step 310 builds a single model (e.g., a regression model) using all the collected data such as the all the values of the plurality of variables V1-Vn from January 1st to December 31st as shown in FIG. 2. The process 300 then obtains a PI value from the single model for each of the significant changed predictors in the candidate list (e.g., PI1, PI2, . . . ). For example, in an embodiment, the built model is represented by the equation Target=($\beta$1*V1+$\beta$2*V2+ . . . +$\beta$n*Vn, where $\beta$ value can be used as the predictor importance (PI) value.

At step 312, the process 300 combines, for each of the significant changed predictor, the trend (Tr) value obtained from the plurality of regression models with the corresponding predictor importance (PI) value obtained from the single model to produce a final predictor value for each of the significant changed predictors. In an embodiment, the process 300 combines the trend (Tr) value with the corresponding predictor importance (PI) based on the following equation:

$$|Tr1|*Pi1, |Tr1|*pi2, ...$$

Assuming that the process 300 at step 308 determines that none of the significant changed predictors in the candidate list have a significant change trend, the process 300 at step 314 selects one the regression models having the normal status from the plurality of regression models (e.g., model T−m covering normal data from January 1st to January 31st in FIG. 2) to evaluate the significant changed predictors in the candidate list. In an embodiment, to evaluate the significant changed predictors in the candidate list the process 300 computes a Pearson correlation value for each of the significant changed predictors using the data from the selected normal status regression model. A Pearson correlation value is a measure of the linear correlation between two variables X and Y. In an embodiment, the process 300 computes the Pearson correlation value by replacing a set of values of a selected significant changed predictor in the first regression model with a second set of values from one of the time periods having the abnormal status, while maintaining all other field values unchanged. In an embodiment, the Pearson correlation value can then be computed using the equation: $\rho 1=\rho(\Delta X, \Delta Y)$, $\Delta X=X1-X$, $\Delta Y=M_{T-m}(X1)-M_{T-m}(X)$, where X1 are abnormal values, and X is the normal value. The process 300 repeats the above steps to compute the Pearson correlation value for each of the significant changed predictors in the candidate list (p1, p2, . . . ). The process 300 at step 316 then builds a single model using all the collected data (i.e., all data for all the values of the plurality of variables V1-Vn for all collected time periods), and obtains a PI value for each of the significant changed predictors from the single model (PI1, PI2, . . . ) as described above in step 310. At step 318, the process 300 combines the Pearson correlation value and the PI value (e.g., PI1*|ρ1|, PI2*|ρ2|, . . . ) for each of the significant changed predictors to produce a final predictor value for each of the significant changed predictors.

The process 300 at step 320 sorts the final predictor values of the significant changed predictors from high to low to identify the significant changed predictors that contribute most to the status change of the target index from the normal status to the abnormal status. The significant changed predictors with the highest final predictor values contribute the most to the status change of the target index from the normal status to the abnormal status.

Figure 5:
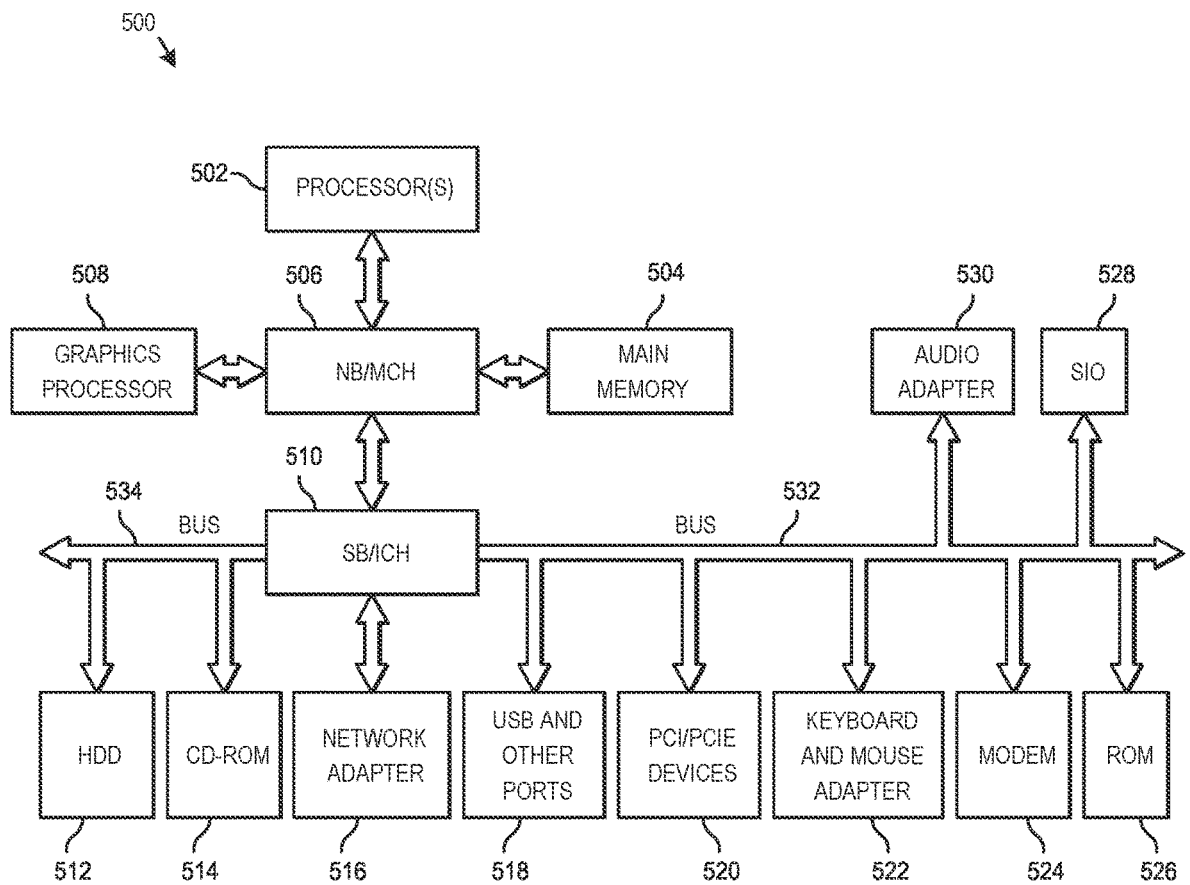
FIG. 5 is a block diagram illustrating a hardware architecture of a system according to an embodiment of the present disclosure in which aspects of the illustrative embodiments may be implemented.

FIG. 5 is a block diagram illustrating a hardware architecture of a system 500 according to an embodiment of the present disclosure in which aspects of the illustrative embodiments may be implemented. For example, the data processing system 500 may be configured to store and execute instructions for performing the process 300 described in FIG. 3. In the depicted example, the data processing system 500 employs a hub architecture including north bridge and memory controller hub (NB/MCH) 506 and south bridge and input/output (I/O) controller hub (SB/ICH) 510. Processor(s) 502, main memory 504, and graphics processor 508 are connected to NB/MCH 506. Graphics processor 508 may be connected to NB/MCH 506 through an accelerated graphics port (AGP). A computer bus, such as bus 532 or bus 534, may be implemented using any type of communication fabric or architecture that provides for a transfer of data between different components or devices attached to the fabric or architecture.

In the depicted example, network adapter 516 connects to SB/ICH 510. Audio adapter 530, keyboard and mouse adapter 522, modem 524, read-only memory (ROM) 526, hard disk drive (HDD) 512, compact disk read-only memory (CD-ROM) drive 514, universal serial bus (USB) ports and other communication ports 518, and peripheral component interconnect/peripheral component interconnect express (PCI/PCIe) devices 520 connect to SB/ICH 510 through bus 532 and bus 534. PCI/PCIe devices may include, for example, Ethernet adapters, add-in cards, and personal computing (PC) cards for notebook computers. PCI uses a card bus controller, while PCIe does not. ROM 526 may be, for example, a flash basic input/output system (BIOS). Modem 524 or network adapter 516 may be used to transmit and receive data over a network.

HDD 512 and CD-ROM drive 514 connect to SB/ICH 510 through bus 534. HDD 512 and CD-ROM drive 514 may use, for example, an integrated drive electronics (IDE) or serial advanced technology attachment (SATA) interface. In some embodiments, HDD 512 may be replaced by other forms of data storage devices including, but not limited to, solid-state drives (SSDs). A super I/O (SIO) device 528 may be connected to SB/ICH 510. SIO device 528 may be a chip on the motherboard configured to assist in performing less demanding controller functions for the SB/ICH 510 such as controlling a printer port, controlling a fan, and/or controlling the small light emitting diodes (LEDS) of the data processing system 500.

The data processing system 500 may include a single processor 502 or may include a plurality of processors 502. Additionally, processor(s) 502 may have multiple cores. For example, in one embodiment, data processing system 500 may employ a large number of processors 502 that include hundreds or thousands of processor cores. In some embodiments, the processors 502 may be configured to perform a set of coordinated computations in parallel.

An operating system is executed on the data processing system 500 using the processor(s) 502. The operating system coordinates and provides control of various components within the data processing system 500 in FIG. 5. Various applications and services may run in conjunction with the operating system. Instructions for the operating system, applications, and other data are located on storage devices, such as one or more HDD 512, and may be loaded into main memory 504 for execution by processor(s) 502. In some embodiments, additional instructions or data may be stored on one or more external devices. The processes described herein for the illustrative embodiments may be performed by processor(s) 502 using computer usable program code, which may be located in a memory such as, for example, main memory 504, ROM 526, or in one or more peripheral devices.

The disclosed embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the disclosed embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying influential effects that contribute most to a status change of a target index, the method comprising:

collecting, by at least one processor, data comprising a plurality of predictors corresponding to a plurality of time periods, the collected data indicating a target index value for each time period in the plurality of time periods;

identifying, by the at least one processor, each of the time periods as being one of a normal status or an abnormal status based on the target index value for each of the time periods;

generating, by the at least one processor, a candidate list comprising significant changed predictors between the time periods having the normal status and the time periods having the abnormal status;

building, by the at least one processor, a plurality of regression models from the collected data;

obtaining, by the at least one processor, a first predictor importance value for each of the significant changed predictors from each regression model in the plurality of regression models to produce a set of predictor importance values for each of the significant changed predictors;

generating, by the at least one processor, a series based on the set of predictor importance values for each of the significant changed predictors;

computing, by the at least one processor, a trend value of each of the series of the significant changed predictors;

determining, by the at least one processor, whether at least one of the significant changed predictors have a significant change trend based on the trend value for each of the significant changed predictors;

building, by the at least one processor, a single model from the collected data comprising all the plurality of time periods;

obtaining, by the at least one processor, a second predictor importance value for each of the significant changed predictors from the single model;

combining, by the at least one processor, the first predictor importance value and the second predictor importance value for each of the significant changed predictors to produce a final predictor value for each of the significant changed predictors; and sorting, by the at least one processor, the final predictor value for each of the significant changed predictors from high to low to identify the significant changed predictors that contribute most to the status change of the target index from the normal status to the abnormal status.

2. The computer-implemented method of claim 1, wherein the first predictor importance value is the trend value in response to determining that at least one of the significant changed predictors have a significant change trend.

3. The computer-implemented method of claim 1, wherein generating the candidate list comprises:

comparing, by the at least one processor, a value distribution for each of the plurality of predictors between the normal status and the abnormal status using a nonparametric test;

comparing, by the at least one processor, a series trait for each of the plurality of predictors between the normal status and the abnormal status; and identifying, by the at least one processor, a predictor as a significant changed predictor for the candidate list when at least one of the value distribution or the series trait for the predictor between the normal status and the abnormal status is not similar based on a predetermined threshold.

4. The computer-implemented method of claim 1, wherein each regression model in the plurality of regression models comprises a same internal time interval, the plurality of regression models built from the time periods having the normal status to the time periods having the abnormal status.

5. The computer-implemented method of claim 1, wherein the first predictor importance value is a Pearson correlation value in response to determining that none of the significant changed predictors have a significant change trend.

6. The computer-implemented method of claim 5, wherein the computer-implemented method determines the Pearson correlation value by selecting a first regression model having the normal status from the plurality of regression models, and computing the Pearson correlation value for each of the significant changed predictors in the candidate list in the first regression model.

7. The computer-implemented method of claim 6, wherein computing the Pearson correlation value for each of the significant changed predictors in the candidate list in the first regression model comprises for each of the significant changed predictors in the candidate list, selecting a significant changed predictor in the candidate list, and replacing a set of values of the significant changed predictor in the first regression model with a second set of values from one of the time periods having the abnormal status, while maintaining all other field values unchanged.

8. A system configured to identify influential effects that contribute most to a status change of a target index, the system comprising memory for storing instructions, and a processor configured to execute the instructions to:

collect data comprising a plurality of predictors corresponding to a plurality of time periods, the collected data indicating a target index value for each time period in the plurality of time periods;

identify each of the time periods as being one of a normal status or an abnormal status based on the target index value for each of the time periods;

generate a candidate list comprising significant changed predictors between the time periods having the normal status and the time periods having the abnormal status;

build a plurality of regression models from the collected data;

obtain a first predictor importance value for each of the significant changed predictors from each regression model in the plurality of regression models to produce a set of predictor importance values for each of the significant changed predictors;

generate a series based on the set of predictor importance values for each of the significant changed predictors;

compute a trend value of each of the series of the significant changed predictors;

determine whether at least one of the significant changed predictors have a significant change trend based on the trend value for each of the significant changed predictors;

build a single model from the collected data comprising all the plurality of time periods;

obtain a second predictor importance value for each of the significant changed predictors from the single model;

combine the first predictor importance value and the second predictor importance value for each of the significant changed predictors to produce a final predictor value for each of the significant changed predictors; and sort the final predictor value for each of the significant changed predictors from high to low to identify the significant changed predictors that contribute most to the status change of the target index from the normal status to the abnormal status.

9. The system of claim 8, wherein the first predictor importance value is the trend value in response to determining that at least one of the significant changed predictors have a significant change trend.

10. The system of claim 8, wherein the instructions to generate the candidate list comprises instructions to:

compare a value distribution for each of the plurality of predictors between the normal status and the abnormal status using a nonparametric test;

compare a series trait for each of the plurality of predictors between the normal status and the abnormal status; and identify a predictor as a significant changed predictor for the candidate list when at least one of the value distribution or the series trait for the predictor between the normal status and the abnormal status is not similar based on a predetermined threshold.

11. The system of claim 8, wherein each regression model in the plurality of regression models comprises a same internal time interval, the plurality of regression models built from the time periods having the normal status to the time periods having the abnormal status.

12. The system of claim 8, wherein the first predictor importance value is a Pearson correlation value in response to determining that none of the significant changed predictors have a significant change trend.

13. The system of claim 12, wherein the system determines the Pearson correlation value by selecting a first regression model having the normal status from the plurality of regression models, and computing the Pearson correlation value for each of the significant changed predictors in the candidate list in the first regression model.

14. The system of claim 13, wherein computing the Pearson correlation value for each of the significant changed predictors in the candidate list in the first regression model comprises for each of the significant changed predictors in the candidate list, selecting a significant changed predictor in the candidate list, and replacing a set of values of the significant changed predictor in the first regression model with a second set of values from one of the time periods having the abnormal status, while maintaining all other field values unchanged.

15. A computer program product for identifying influential effects that contribute most to a status change of a target index, the computer program product comprising a computer readable storage medium having program instructions embodied therewith, the program instructions executed by a processor of a system to cause the system to:
  collect data comprising a plurality of predictors corresponding to a plurality of time periods, the collected data indicating a target index value for each time period in the plurality of time periods;
  identify each of the time periods as being one of a normal status or an abnormal status based on the target index value for each of the time periods;
  generate a candidate list comprising significant changed predictors between the time periods having the normal status and the time periods having the abnormal status;
  build a plurality of regression models from the collected data;
  obtain a first predictor importance value for each of the significant changed predictors from each regression model in the plurality of regression models to produce a set of predictor importance values for each of the significant changed predictors;
  generate a series based on the set of predictor importance values for each of the significant changed predictors;
  compute a trend value of each of the series of the significant changed predictors;
  determine whether at least one of the significant changed predictors have a significant change trend based on the trend value for each of the significant changed predictors;
  build a single model from the collected data comprising all the plurality of time periods;
  obtain a second predictor importance value for each of the significant changed predictors from the single model;
  combine the first predictor importance value and the second predictor importance value for each of the significant changed predictors to produce a final predictor value for each of the significant changed predictors; and
  sort the final predictor value for each of the significant changed predictors from high to low to identify the significant changed predictors that contribute most to the status change of the target index from the normal status to the abnormal status.

16. The computer program product of claim 15, wherein the first predictor importance value is the trend value in response to determining that at least one of the significant changed predictors have a significant change trend.

17. The computer program product of claim 15, wherein the program instructions executed by the processor of the system to generate the candidate list comprises instructions to:
  compare a value distribution for each of the plurality of predictors between the normal status and the abnormal status using a nonparametric test;
  compare a series trait for each of the plurality of predictors between the normal status and the abnormal status; and
  identify a predictor as a significant changed predictor for the candidate list when at least one of the value distribution or the series trait for the predictor between the normal status and the abnormal status is not similar based on a predetermined threshold.

18. The computer program product of claim 15, wherein each regression model in the plurality of regression models comprises a same internal time interval, the plurality of regression models built from the time periods having the normal status to the time periods having the abnormal status.

19. The computer program product of claim 15, wherein the first predictor importance value is a Pearson correlation value in response to determining that none of the significant changed predictors have a significant change trend.

20. The computer program product of claim 19, wherein the system determines the Pearson correlation value by selecting a first regression model having the normal status from the plurality of regression models, and computing the Pearson correlation value for each of the significant changed predictors in the candidate list in the first regression model.

* * * * *